UNITED STATES PATENT OFFICE.

EDGAR ARTHUR ASHCROFT, OF NEWCASTLE, NEW SOUTH WALES.

TREATING SOLUTIONS OR ORES CONTAINING ZINC FOR RECOVERING ZINC AS OXIDS.

SPECIFICATION forming part of Letters Patent No. 602,295, dated April 12, 1898.

Application filed September 4, 1896. Serial No. 604,865. (No specimens.)

*To all whom it may concern:*

Be it known that I, EDGAR ARTHUR ASHCROFT, a subject of the Queen of Great Britain, and a resident of May Croft, Newcommen street, Newcastle, New South Wales, have invented a new and useful Improvement in the Treatment of Solutions or Ores Containing Zinc for the Recovery of the Zinc as Oxid, of which the following is a specification.

The object of my invention is to obtain zinc oxid from ores or solutions containing zinc in a cheaper and more convenient manner than heretofore.

It is well known that the recovery of zinc from ores or solutions presents great difficulty, because its more easily formed salts are not easily decomposed, are volatile, or present other hampering tendencies. I have discovered that these difficulties can be obviated and that zinc can be economically recovered from ores or solutions in the form of zinc oxid by the following process:

The zinc being first obtained in solution as sulfate or chlorid, the addition of zinc oxid to such solution will precipitate their zinc contents, together with the added oxid, in compounds known as "basic zinc salts." The composition of these basic salts varies with the conditions of production, but their most general composition is

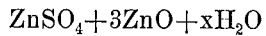

or

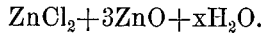

These basic salts may be converted into zinc oxid much more readily than the corresponding neutral salts, and as zinc oxid is the agent I employ for the production of the basic salts a suitable proportion of the zinc oxid finally produced can be again used for the treatment of fresh quantities of zinc solution, thus making the process cyclical. The balance of zinc oxid not required for the treatment of further solutions is available for disposal in any of the various commercial industries in which zinc oxid is used. Notably it can be reduced to metal by retorting in distillation-furnaces or by electrolytic processes. The sulfuric acid can also be recovered from the basic zinc salts and again used cyclically for obtaining the solutions of sulfate of zinc from the ores.

In applying my process to the treatment of zinc-bearing ores I prefer to operate as follows: The zinc is first obtained in solution from roasted ores by means of sulfuric acid, and the solution is heated to between 80° and 100° centigrade and brought to a strength of about two hundred grams per liter, more or less. Zinc oxid is then added to the hot solution in the proportions of about two grams of zinc as oxid for every gram of zinc in the solution. The mixture is then intimately mixed by stirring in a grinding-pan or other suitable apparatus. In a short time the mixture will become pasty, owing to the formation of basic salts and the absorption of the water of solution. The pasty mass is then converted into zinc oxid by either of the following methods:

First. It can be heated to a strong red heat in a muffle or other furnace until the sulfuric acid is driven off, leaving the zinc-oxid residue. The resultant gases can be collected and reconverted in lead chambers into sulfuric acid for use again.

Second. The decomposition of the salts can be facilitated and effected at a much lower temperature by intimately mixing carbon, preferably in the form of finely-powdered charcoal, with the pasty mass in the proportion of about one-twentieth of the weight of the zinc to be recovered from the solution and subjecting the mixture to a uniform temperature corresponding to a few degrees below the melting-point of aluminium metal. Sulfurous-acid gases are disengaged and can be converted into sulfuric acid in lead chambers.

Alternatively the zinc-sulfate solution may be used weaker. It is then heated, put into agitators, and, zinc oxid being added in suitable proportion, it is stirred until the reaction has taken place. The basic salt is then collected and separated by filtration or other means from the remaining liquor, which need not be entirely freed of zinc and can be used over again for leaching fresh ore after the addition of sulfuric acid. The precipitate is then dried and converted into zinc oxid by either of the methods described above.

Although I have confined the foregoing description of my process to zinc-sulfate solutions, other zinc salts, such as zinc chlorid, react with zinc oxid in a similar manner and may in some cases be employed with advantage.

Having now particularly described and ascertained the nature of my said invention and in what manner the same is to be performed, I declare that what I claim is—

1. The herein-described process for the treatment of ores or solutions containing zinc, which consists in (a) obtaining from the zinc-bearing ore or solution solutions of zinc sulfate; (b) adding zinc oxid and stirring the mixture until a pasty consistency is obtained; and (c) heating the resulting product for the purpose of converting it into zinc oxid, sulfuric or sulfurous acid gas being disengaged; all substantially as described, and for the purposes specified.

2. The herein-described process for the treatment of ores or solutions containing zinc consisting in (a) obtaining solutions of zinc sulfate, (b) adding zinc oxid and stirring the mixture until a pasty consistency is obtained, (c) treating the resulting product for the production of zinc oxid, by first intimately mixing with it carbon (preferably as powdered charcoal) and finally heating the mixture at a uniform temperature for the purpose of converting it into zinc oxid, sulfuric or sulfurous acid gas being disengaged all substantially as described, and for the purposes specified.

3. The herein-described process of treating neutral zinc solutions for the production of zinc oxid, which consists in first converting the neutral zinc salt into basic zinc salt by the addition of zinc oxid, and then intimately mixing with said basic zinc salt, carbon in approximately the proportion of one-twentieth of the weight of the zinc to be recovered, and heating the mixture to a temperature approximating the melting-point of aluminium, substantially as specified.

In testimony that I claim the foregoing as my invention I have signed my name, in presence of two witnesses, this 20th day of July, 1896.

EDGAR ARTHUR ASHCROFT.

Witnesses:
CHARLES N. COLLISON,
A. O. SACHSE.